United States Patent
Centner

(10) Patent No.: US 8,686,317 B2
(45) Date of Patent: Apr. 1, 2014

(54) REMOVABLE NOZZLE-COOLING MECHANISM FOR WELDING TORCHES

(75) Inventor: Robert J. Centner, Frankfort, IL (US)

(73) Assignee: Illinois Tool Works Inc., Glenview, IL (US)

(*) Notice: Subject to any disclaimer, the term of this patent is extended or adjusted under 35 U.S.C. 154(b) by 1894 days.

(21) Appl. No.: 11/375,788

(22) Filed: Mar. 15, 2006

(65) Prior Publication Data

US 2007/0215587 A1 Sep. 20, 2007

(51) Int. Cl.
*B23K 9/12* (2006.01)

(52) U.S. Cl.
USPC ............ 219/137.62; 219/137.63; 219/137.42

(58) Field of Classification Search
USPC ................. 219/137.62, 137.42, 76.11, 74, 70
See application file for complete search history.

(56) References Cited

U.S. PATENT DOCUMENTS

| | | | | |
|---|---|---|---|---|
| 2,302,734 A | * | 11/1942 | Babcock | 239/424.5 |
| 2,510,415 A | * | 6/1950 | Pitcher | 219/137.42 |
| 2,856,510 A | * | 10/1958 | Jones et al. | 219/74 |
| 3,083,289 A | | 3/1963 | Munro et al. | |
| 3,179,782 A | * | 4/1965 | Matvay | 219/76.16 |
| 3,261,962 A | * | 7/1966 | Carkhuff et al. | 219/137.42 |
| 3,283,121 A | * | 11/1966 | Bernard et al. | 219/137.44 |
| 3,309,492 A | | 3/1967 | Fields | |
| 3,496,328 A | | 2/1970 | Moerke | |
| 3,803,381 A | | 4/1974 | Bernard et al. | |
| 4,358,662 A | * | 11/1982 | Cranor et al. | 219/230 |
| 4,508,951 A | * | 4/1985 | Rehrig, Jr. | 219/74 |
| 5,129,333 A | | 7/1992 | Frederick et al. | |

FOREIGN PATENT DOCUMENTS

GB 313623 A 4/1930
JP 63295071 A * 12/1988

* cited by examiner

*Primary Examiner* — Brian Jennison
(74) *Attorney, Agent, or Firm* — Fletcher Yoder P.C.

(57) ABSTRACT

A removable cooling collar is provided for cooling the nozzle of a welding nozzle. This collar includes first and second parts in fluid communication with a chamber that extends circumferentially within a hollow structure. Cooling fluid circulating through the chamber facilitates dissipation and/or extraction of heat in the nozzle, in turn reducing the likelihood of weld splatter adhesion on the nozzle.

20 Claims, 3 Drawing Sheets

REMOVABLE NOZZLE-COOLING MECHANISM FOR WELDING TORCHES

BACKGROUND

The present invention relates generally to welding torches and, particularly, to a removable nozzle-cooling device for welding torches.

A common metal welding technique employs the heat generated by electrical arcing to transition one or more workpieces to a molten state, thereby facilitating the weld. One technique that employs this arcing principle is wire-feed welding. At its essence, wire-feed welding involves routing current from a power source and into an electrode that is brought into close proximity with the workpiece. When close enough, current arcs from the electrode to the workpiece, completing a circuit and generating sufficient heat to transition the workpiece to a molten state, effectuating welding of the workpiece.

To prevent the ingress of impurities into the molten weld and to improve the weld, a flow of shielding material is often provided about the weld location. For example, inert shielding gas from a gas source can be routed through a welding cable and, at its conclusion, toward the weld location. Generally, this shielding material is focused toward the weld location by a nozzle located at the downstream most position on the torch.

Heat generated during the welding operation migrates into the nozzle, because of the nozzle's proximity to the weld location. In turn, the temperature of the nozzle increases. Unfortunately, weld splatter, which is a polluting byproduct of the welding operation, better adheres to heated nozzle surfaces, interfering with the flow of shielding material. By way of example, weld splatter adhering to the interior surfaces of the nozzle may, over time, reduce the diameter of the passage provided for the shielding gas, thereby impeding the flow path and reducing volume of flowing gas and, in certain instances, closing off the flow path completely.

Unfortunately, most welding torch assemblies in use generally do not include a mechanism for cooling the nozzle to prevent or reduce the accumulation of weld splatter. Instead, traditional welding torch nozzles rely on regular cleanings to provide a good flow path for shielding gas. These cleanings can be time-consuming and, often, lead to unwanted downtime and delays in the welding operation. Moreover, if the operator delays or forgets the cleaning, gas flow is again impeded, and inferior welds may be produced.

Additionally, although certain traditional techniques to reduce weld-splatter adherence are known, these techniques require the complete replacement of the welding torch nozzle. In other words, traditional weld-spatter reducing techniques are dedicated with respect to the nozzle employed, requiring an operator to bear additional costs by requiring replacement of an entire assembly rather than just the nozzle. Moreover, such traditional nozzle-dedicated techniques are not transferable to welding torches of differing nozzle design, further requiring an operator to maintain an inventory for different nozzles. Maintaining such an inventory can lead to increased costs, which are, of course, undesirable.

Accordingly, there exists a need for improved nozzle-cooling techniques, and, particularly, improved welding torch nozzle-cooling techniques.

BRIEF DESCRIPTION

In accordance with certain embodiments, the present technique provides a cooling collar for the cooling of a welding torch nozzle. The exemplary cooling collar is a hollow structure that has an inner peripheral surface and an outer peripheral surface, the inner peripheral surface at least partially defining an aperture for receiving a nozzle. This exemplary cooling collar also includes a discontinuity that extends axially through the collar. In cooperation with an adjustment mechanism, this discontinuity facilitates adjustment of the size of the aperture, for placement of the collar circumferentially about nozzles of different sizes and geometries.

To effectuate cooling of a welding torch nozzle during operation, for instance, the exemplary cooling collar may include a chamber that is located intermediate the inner and outer peripheral surfaces and that extends circumferentially about the hollow structure. This chamber is in fluid communication with first and second ports that facilitate circulation of a cooling fluid through the cooling collar, thus convectively dissipating heating generated during operation. Dissipation of excess heat in the nozzle offers the additional advantage of reducing the likelihood of weld splatter adhering to the nozzle.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
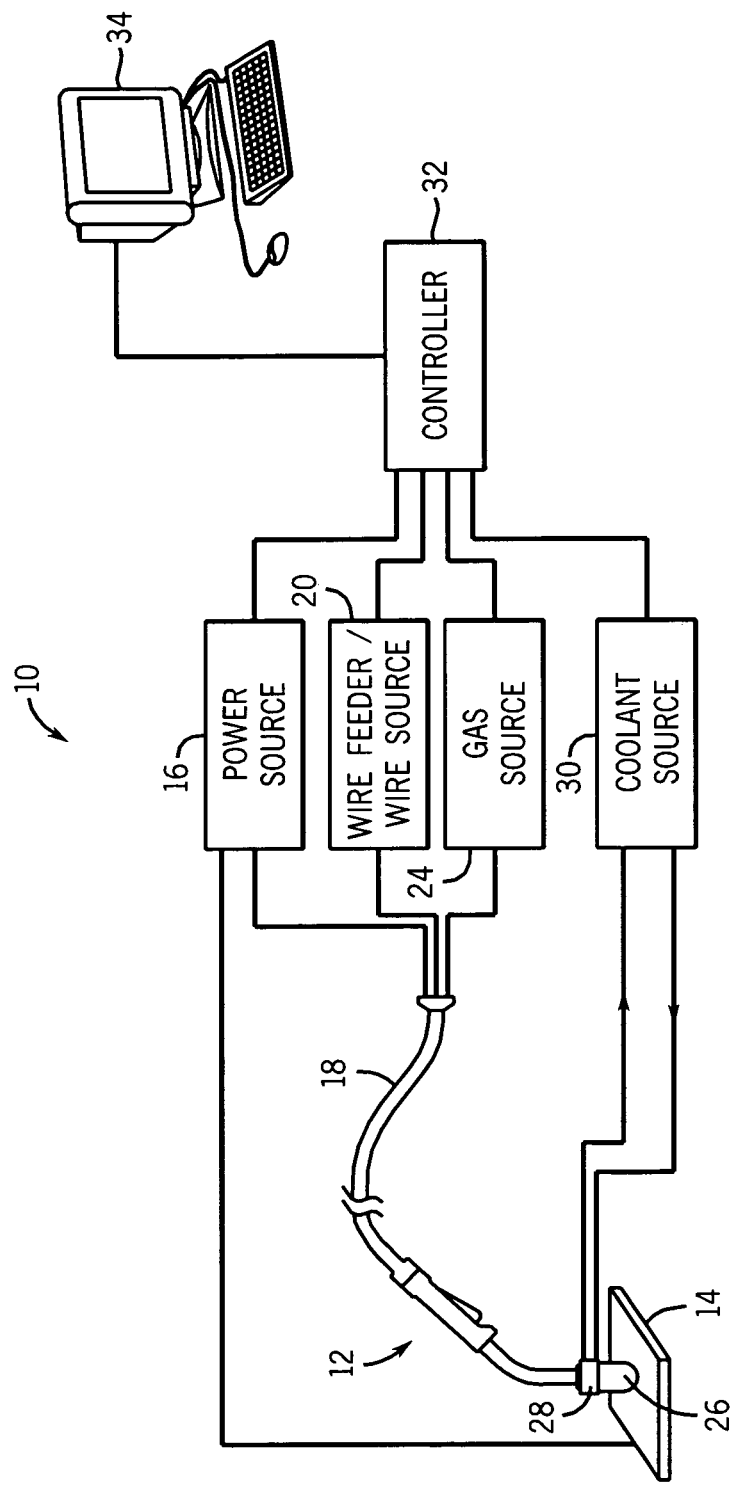
FIG. 1 is a diagrammatical representation of a welding system, in accordance with an exemplary embodiment of the present technique.

Turing to the drawings, FIG. 1 illustrates an exemplary gas-shielded wire-feed welding system 10. Prior to continuing, however, it is worth noting that the following discussion merely relates to exemplary embodiments of the present technique. As such, the appended claims should not be viewed as limited to those embodiments discussed herein. Indeed, the present invention provides benefits to any number of devices in which nozzle cooling is a concern.

Returning to the exemplary welding system 10, it includes a welding torch 12 that defines the location of the welding operation with respect to a workpiece 14. Placement of the welding torch 12, whether manually or mechanically, at a location proximate to the workpiece 14 allows current, which is provided by a power source 16 and which is routed to the welding torch via a welding cable 18, to arc from the welding torch 12 to the workpiece 14. In summary, this arcing completes a circuit from the power source 16, to the welding torch 12 via the welding cable 18, to the workpiece 14, and, at its conclusion, back to the power source 16, generally to ground. The arcing of this current generates heat, in turn transitioning the workpiece 14 and any added metal to a molten state and facilitating the welding operation.

To produce electrical arcing, the exemplary system 10 includes a wire feeder 20 that provides a consumable wire electrode to the welding cable 18, and, in turn, to the welding torch 12. As discussed further below, the welding torch 12 routes electrical current to the wire electrode via a contact tip 22 (see FIG. 5), leading to arcing between the egressing wire electrode and the workpiece 14.

To shield the weld area from contaminants and to improve arc performance, the exemplary system 10 includes a gas source 24 that feeds an inert shielding gas to the welding torch 12 via the welding cable 18. This shielding gas is then focused to the weld location by a nozzle 26 that is electrically isolated from the power source 16 and that is located at the downstream most end of the welding torch 12. It is worth noting, however, that a variety of shielding materials, including various fluids and particulate solids, may be employed to protect the weld location. An inert shielding gas is merely one example.

During operation of the welding system 10, as discussed further below, undesirable byproducts, such as radiant heat and weld splatter, are produced. As a specific concern, it is believed that weld splatter tends to accumulate on the surfaces of a heated nozzle 26, eventually interfering with the flow shielding gas and, in certain instances, blocking the flow of shielding gas completely. To reduce the accumulation of weld splatter on the nozzle 26, the exemplary system 10 includes a cooling collar 28 that surrounds portions of the nozzle 26. The cooling collar 28, in cooperation with a coolant source 30, circulates cooling fluid, drawing heat away from the nozzle 26 and reducing the nozzle operating temperature. By reducing the operating temperature of the nozzle, the likelihood of weld splatter accumulation on the surfaces of the nozzle 26 is reduced, leading to improved performance of the welding system 10. Further details regarding the cooling collar 28 are provided below.

The exemplary system 10 also includes at least one controller 32 to manage various functions and operations of the system 10. Types of controllers 32 include programmable logic controllers (PLCs), state switches, microprocessors, among other devices. The controller 32 receives inputs from the various components of the system 10 (e.g., the welding torch 12, power source 16, coolant source 30) and provides appropriate responses to these components. For communications with a user, the exemplary controller 32 is coupled to a user interface 34, which provides input/output functionality for the system 10.

Figure 2:
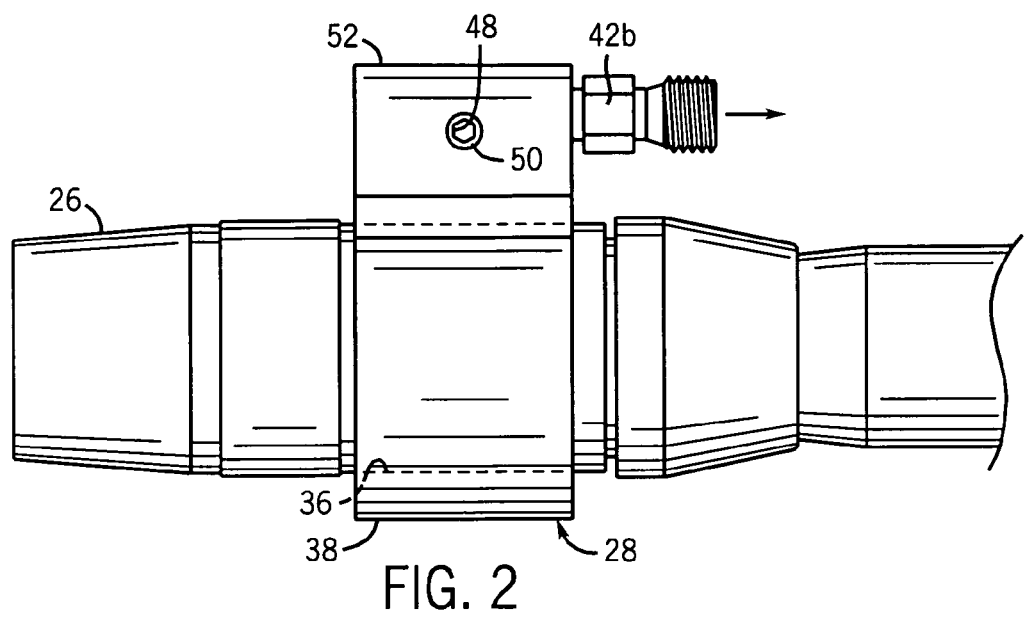
FIG. 2 is side view of an exemplary cooling collar disposed about a welding torch nozzle, in accordance with an exemplary embodiment of the present technique.
Figure 3:
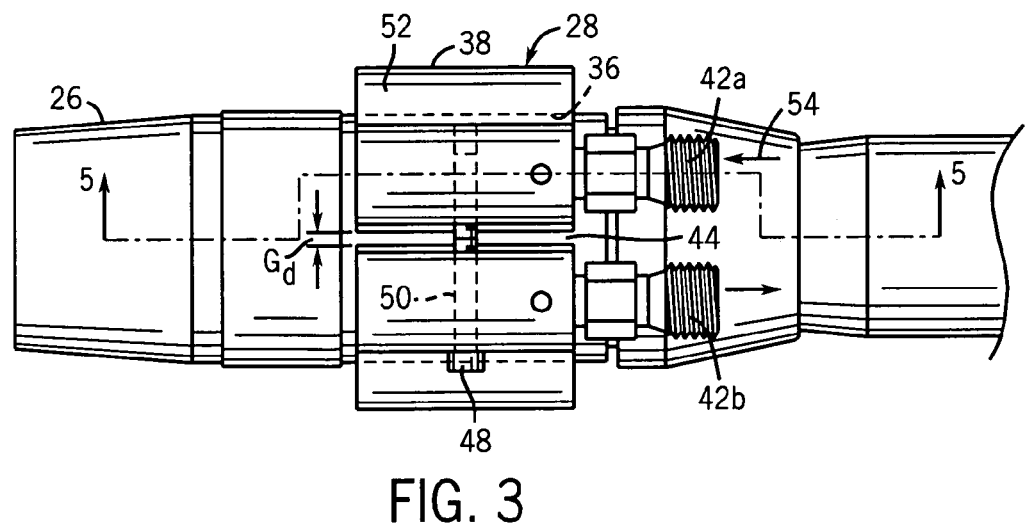
FIG. 3 is a top view of the exemplary cooling collar and nozzle assembly of FIG. 2.
Figure 4:
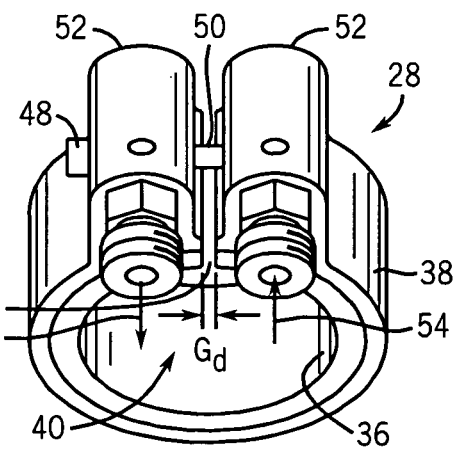
FIG. 4 is a perspective view of a cooling collar, in accordance with an exemplary embodiment of the present technique.

Turning to FIGS. 2, 3, and 4, the illustrated and exemplary cooling collar 28 is a hollow structure with a generally annular profile, whether arcuate or polygonal, defined by its inner peripheral surface 36 and its outer peripheral surface 38. Again, although shown as having an arcuate profile, any number of profiles for the cooling collar 28 are envisaged, including polygonal shapes. Thus, the term annular, as used herein, is not limited to circular shapes. Indeed, the defining inner and outer peripheral surfaces, 36 and 38, respectively, each may comprise a single, smoothly curved surface or a number of linear surfaces cooperative to define a polygonal profile or any combination of curved and linear surfaces, for example.

The inner peripheral surface 36 of the exemplary cooling collar 28 defines an aperture 40 for receiving the nozzle 26. That is, the inner peripheral surface 36 defines, at least partially, the aperture 40 through which the nozzle 26 of a welding torch 12 is inserted. When assembled, the inner peripheral surface 36 of the cooling collar 28 essentially circumscribes the inserted nozzle 26.

The exemplary cooling collar 28 also has two ports 42, an inlet port 42a and outlet port 42b that are located on opposite sides of a discontinuity 44 extending axially through the cooling collar 28. As discussed further below, these ports 42a and 42b are in fluid communication with a chamber 46 (see FIG. 4) internal to the collar 28. In a presently contemplated embodiment, these exemplary ports include threaded portions that facilitate connection to correspondingly threaded conduits, such as pipes or tubes, coupled to the coolant source 30 (see FIG. 1).

The exemplary cooling collar 28 also includes an adjustment mechanism 48 that facilitates releasable securment of the cooling collar 28 to its corresponding nozzle 26. As discussed above, the inner peripheral surface 36 of the cooling collar 28 defines an aperture 40 that is sized to receive the welding torch nozzle 26 therethrough. Nozzles, however, may be of varying size and shape. To accommodate such variances, the adjustment mechanism 48 changes the size of the aperture 40, to best accommodate the geometry of the nozzle 26 with which it is used. As illustrated, the exemplary adjustment mechanism 48 includes a threaded fastener 50 that extends through raised portions 52 of the collar 28, and across the discontinuity 44 of the cooling collar 28. By actuating the fastener 50 the raised portions 52 of the collar 28 can be positioned selectively closer to or further apart from one another. For example, actuation of the threaded fastener 50 influences a gap distance ($G_d$) defined by the discontinuity 44. Specifically, rotating the threaded fastener 50 in one direction causes the distance $G_d$ to decrease, while rotating the fastener 50 in the opposite direction causes the distance $G_d$ to increase. Increasing the distance $G_d$ leads to an increase in the size of the aperture 40, while a decrease in the distance $G_d$ leads to a decrease in the size of the aperture 40. Thus, by manipulating the threaded fastener, the cooling collar 28 can be adapted to accommodate nozzles of different sizes.

Moreover, the adjustability of the size of the aperture 40 also facilitates quick installation and removal of the cooling collar 28 with respect to the nozzle 26 with which it is employed. It is worth noting that alternate embodiments for the adjustment mechanism are also envisaged, as a change in the distance $G_d$ may be effectuated by a clasping mechanism, among other devices employed to draw the portions of the cooling collar 28 adjacent to the discontinuity 44 closer to or further apart from one another. Additionally, it is worth noting that a resilient or flexible material may be placed in the discontinuity 44. Such material may, however, allow changes in the distance $G_d$ effectuated by the adjustment mechanism 48. In summary, changing the size of the aperture 40 allows the cooling collar 28 to clamp onto the nozzle 26, providing a secure friction fit between the inner peripheral surface 36 of the collar and the external peripheral surface of the nozzle 26.

Figure 5:
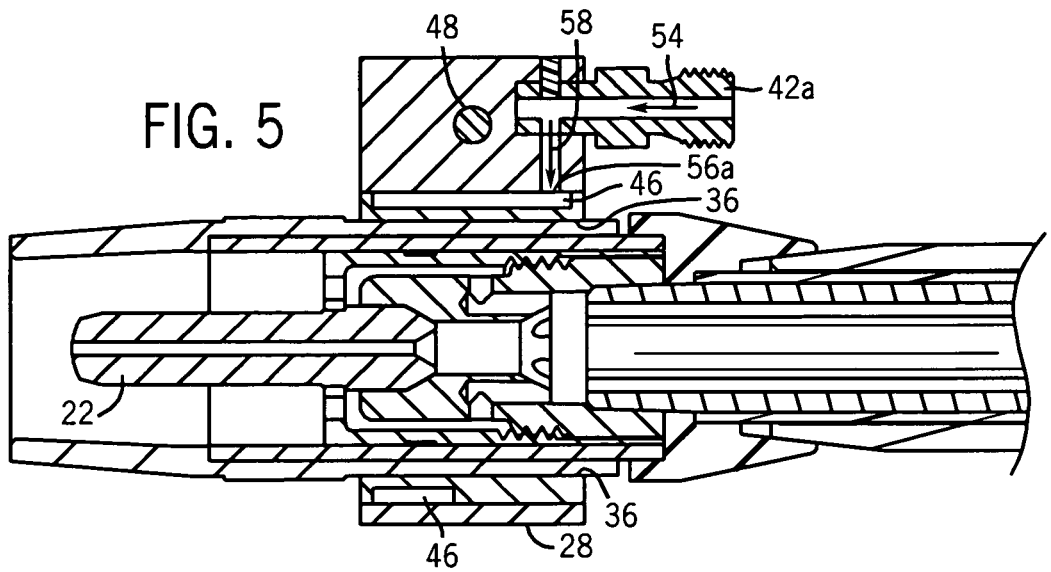
FIG. 5 is a cross-sectional view of the exemplary cooling collar of FIG. 2, along line 5-5 of FIG. 3.

When assembled onto the nozzle 26, the cooling collar 28 provides a mechanism through which heat generated during operation of the welding torch 12 is dissipated or extracted, thus reducing the operating temperature of the nozzle 26. This dissipation or extraction of heat is facilitated by circulating a cooling fluid through a fluid pathway that begins at the inlet port 42a, internally circumscribes the cooling collar 28 via the chamber 46, and concludes at the outlet port 42b, returning the cooling fluid back to the coolant source 30. (See FIG. 1.) As best illustrated in FIG. 5, cooling fluid enters the cooling collar 28 via inlet port 42a, as represented by arrow 54. Fluid is then routed through a bore 56a that extends radially through the cooling collar 28. Thus, fluid is routed radially inward with respect to the cooling collar 28, as represented by arrow 58. The bore 56a then feeds into the chamber 46 that, as discussed above, circumferentially extends around the cooling collar 28. Thus, as represented by arrows 60, cooling fluid flows into the page, around the body of the cooling collar 28 and back up and out of the page. Once circulated around the cooling collar 28, cooling fluid is then routed radially upward through a second bore 56b and egresses through outlet port 42b, returning to the cooling source 30, the return being represented by arrow 64.

It is believed that circulating cooling fluid through the cooling collar 28 and around the nozzle 26 effectuates a significant decrease in operating temperatures of the nozzle 26, in turn reducing relatively significantly the adhesion of weld splatter to the nozzle. It is also believed that such a decrease in the temperature of the nozzle leads to decreased weld splatter adhesion to the nozzle itself improving the flow of shielding material.

Figure 6:
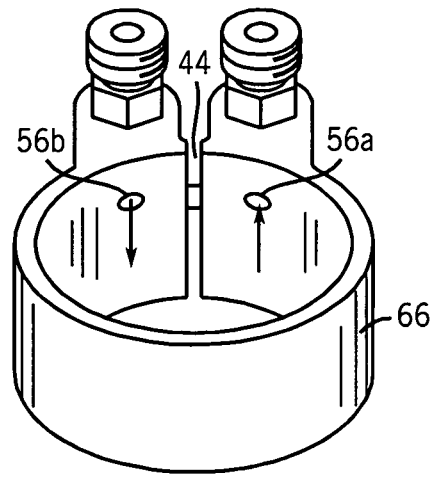
FIG. 6 is a perspective view of an outer member of a two-piece cooling collar, in accordance with an exemplary embodiment of the present technique.
Figure 7:
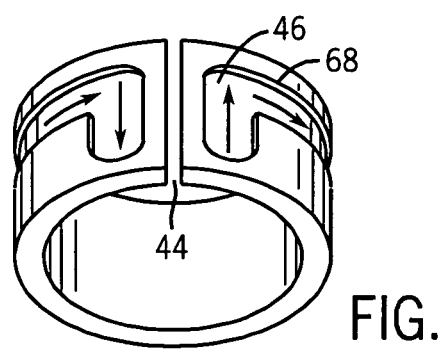
FIG. 7 is a perspective view of an inner member of a two-piece cooling collar, in accordance with an exemplary embodiment of the present technique.

FIGS. 6 and 7 illustrate an exemplary two-piece cooling collar assembly, FIG. 6 illustrating the outer member 66 of the cooling collar 28 and FIG. 7 illustrating the inner member 68. As illustrated, the outer member 66 carries the inlet and outlet bores 56a and 56b, while the inner member 68 carries the chamber 46. However, it is worth noting that the chamber 46 is, when in a two-piece assembly, defined cooperatively by the inner and outer members, 68 and 66 respectively. Thus, the chamber 46 may be defined by a recessed portion that is recessed radially inward with respect to the inner member alone, with respect to the outer member alone, or with respect to a combination of the inner and outer members.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A collar which is attachable to an outer surface of a welding torch nozzle comprising:
   a heat conductive structure having an inner circumferential surface through which the outer surface of the welding torch nozzle is inserted, wherein the welding torch nozzle extends axially beyond the collar in a direction of a weld;
   a fluid circuit which is in heat transfer relationship with the heat conductive structure to transfer heat away from the heat conductive structure when a fluid is circulated through the circuit; and
   a mechanism to releasably secure the heat conductive structure to the welding torch nozzle.

2. The collar of claim 1, wherein the heat conductive structure includes a pair of peripheral walls disposed in generally concentric relation to define a chamber therebetween.

3. The collar of claim 2, wherein the heat conductive structure includes inlet and outlet ports in fluid communication with the chamber.

4. The collar of claim 1, wherein the mechanism to releasably secure the heat conductive structure to the welding torch nozzle includes a threaded member that opens and closes a gap in the heat conductive structure.

5. A cooling collar which is attachable to an outer surface of a welding torch nozzle comprising:
   an hollow structure having a discontinuity extending axially therethrough, at least one inner peripheral wall and at least one outer peripheral wall forming a chamber therebetween, wherein the at least one inner peripheral wall defines an aperture for receiving the outer surface of the welding torch nozzle, wherein the welding torch nozzle extends axially beyond the cooling collar in a direction of a weld;
   first and second ports in fluid communication with the chamber; and
   an adjustment mechanism configured to adjust the size of the aperture to releasably secure the hollow structure to the welding torch nozzle.

6. The cooling collar of claim 5, wherein the adjustment mechanism is configured to adjust a gap distance defined by the discontinuity.

7. The cooling collar of claim 5, wherein the adjustment mechanism comprises a threaded member.

8. The cooling collar of claim 7, wherein the threaded member extends from a first portion of the hollow structure located on a one side of the discontinuity to a second portion of the hollow structure located on the other side of the discontinuity.

9. The cooling collar claim 5, comprising an elastically deformable material disposed in the discontinuity.

10. The cooling collar of claim 5, wherein the at least one inner peripheral wall is arcuate.

11. A cooling collar which is attachable to an outer surface of a welding torch nozzle comprising:
    an inner hollow member and an outer hollow member cooperative with one another to define a chamber for routing a fluid, the inner hollow member having an inner peripheral surface that at least partially defines an aperture for receiving the outer surface of the welding torch nozzle, wherein the welding torch nozzle extends axially beyond the cooling collar in a direction of a weld;
    first and second ports in fluid communication with one another via the chamber; and
    an adjustment mechanism configured to decrease the size of the aperture to releasably secure the cooling collar to the welding torch nozzle.

12. The cooling collar of claim 11, wherein the outer hollow member is fused to the inner hollow member.

13. The cooling collar of claim 11, wherein each of the first and second ports includes a threaded portion.

14. The cooling collar of claim 13, wherein the outer hollow member includes a bore extending radially through the outer member to place a first connector in fluid communication with the chamber.

15. The cooling collar of claim 14, wherein the outer hollow member comprises an additional bore extending radially through the outer hollow member to place a second connector in fluid communication with the chamber.

16. The cooling collar of claim 11, wherein the inner hollow member or the outer hollow member or both comprise a metallic material.

17. The cooling collar of claim 11, wherein each of the inner and outer hollow members has a discontinuity extending axially therethrough.

18. A welding torch, comprising:
    a neck assembly configured to route welding resources from a welding cable toward a workpiece;
    a welding torch nozzle electrically isolated from the neck assembly, and releasably secured to the neck assembly;
    a cooling collar having an aperture for receiving the outer surface of the welding torch nozzle, and an internal chamber for routing a fluid circumferentially with respect to the cooling collar, wherein the welding torch nozzle extends axially beyond the cooling collar in a direction of a weld; and an adjustment mechanism configured to adjust the size of the aperture to releasably secure the cooling collar to the outer surface of the welding torch nozzle.

19. The welding torch of claim 18, wherein the cooling collar comprises a discontinuity extending axially therethrough.

20. The welding torch of claim 19, wherein the adjustment mechanism includes a threaded member configured to open and close the discontinuity.

* * * * *